Inventor:
Abram J. Moore,
by Harry E. Dunham
His Attorney.

Patented June 27, 1939

2,164,179

UNITED STATES PATENT OFFICE 2,164,179

TELEMETERING TORQUE AMPLIFIER

Abram J. Moore, Melrose, Mass., assignor to General Electric Company, a corporation of New York Application December 20, 1938, Serial No. 246,885

4 Claims. (Cl. 172—239)

My invention relates to telemetering systems and apparatus and particularly simple, inexpensive means for amplifying the torque of such systems in order that the accuracy of the transmitter need not be sacrificed by the requirement that it furnish substantial torque energy.

The features of my invention which are believed to be novel and patentable will be pointed out in the claims appended hereto. For a better understanding of my invention reference is made in the following description to the accompanying drawing in which Fig. 1 represents a form of my invention where the telemetering receiver is arranged to produce induction motor torque energy in addition to the torque energy conveyed thereto from the transmitter, and Fig. 2 represents a form of the invention where induction motor torque energy is produced in the transmitter and partially conveyed to the receiver electrically.

Figure 1:
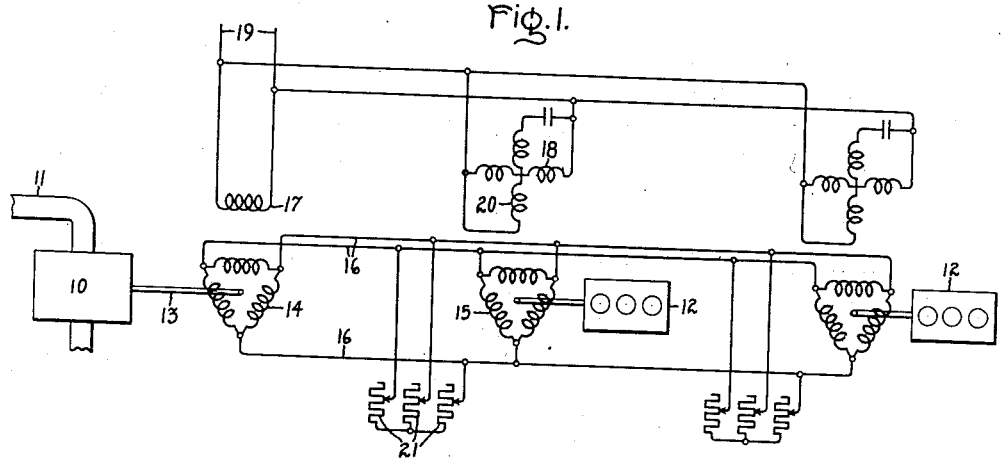
Figure 2:
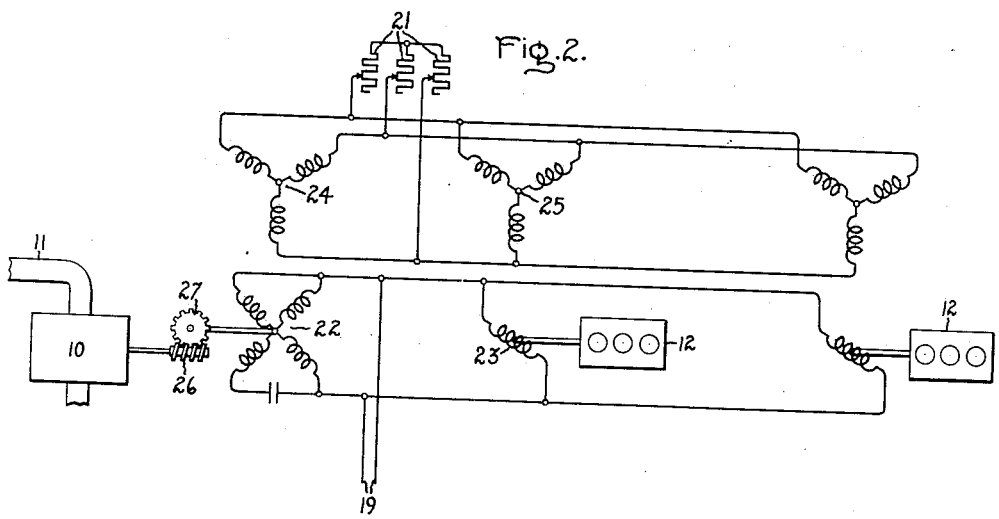

In Fig. 1 I have represented a meter at 10 which we may assume, for example, to be a flow meter for measuring the number of gallons of liquid which flows through a conduit 11. At 12 is a register on which it is desired to count the number of gallons measured by the meter 10. The register 12 may be some distance away from meter 10. Also, it may be a large register which requires more torque energy to drive it than is possible to take from meter 10 and have the meter remain accurate. The present invention permits of driving register 12 in accordance with the accurate measurement of meter 10 without requiring appreciable torque energy from such meter, even though register 12 may be located a considerable distance from the meter and requires considerable torque for its operation.

A shaft 13 extends from meter 10 which, it will be understood, rotates in a given direction in accordance with the flow of liquid through meter 10, and on this shaft is mounted a rotor having a winding 14 similar to a three-phase motor winding. The driving shaft of register 12 is also provided with a similar rotor 15 and the two rotors are interconnected by the three wires 16. The transmitter is provided with a stator having a single phase winding 17. The stator of the receiver has a winding part 18 which may be considered similar to 17 and these winding parts are connected in parallel to a single phase source of supply 19. The receiver stator has a second winding part 20 displaced at an angle to winding part 18 and connected in parallel therewith through a phase shifting device such as a condenser. The receiver stator is thus connected as a two-phase motor and has a polyphase as distinguished from a single phase primary.

If the winding part 20 and its connections were omitted from the receiver, the other parts thus far described would be similar to a well-known form of synchronous telemetering system of the prior art. In such prior art system, however, the torque which is required to drive the receiver and registering device, such as 12, must be furnished by the device which drives the transmitter, which, in this case, would be the flow meter 10. However, flow meters and many other types of meters are not designed or intended to furnish any great amount of torque, and when loaded by anything requiring more torque than a very light, directly connected counting register, become inaccurate as a meter. Hence, it is not possible for the meter 10 to drive the transmitter generator 14 and transmit any appreciable amount of torque energy over the transmission lines 16 to the receiver 15 and have the meter 10 operate accurately as a flow meter.

To overcome this difficulty in a simple manner, I furnish the greater amount of torque energy for driving the receiver by causing the receiver (in Fig. 1) to function as a polyphase motor taking torque energy through its polyphase stator winding independently of any torque energy that may be transmitted thereto through the lines 16 from the rotor 14 of the transmitter. The polyphase stator winding 18—20 of the receiver furnishes a rotating magnetic field as distinguished from a single phase field and hence, if a suitable polyphase resistance 21 be connected across the rotor secondary winding 15 of the receiver, this device tends to run as an induction motor. The resistance 21 is adjusted such that the induction motor torque furnished by this polyphase motor action is not quite sufficient to rotate register 12, and the connection of the stator winding is such that this induction motor torque energy is in a direction to drive register 12 in the forward direction, i. e., in the same direction as it would be driven by normal telemetering action. Now, when a small amount of additional torque energy is transmitted to the receiver through lines 16 by forward movement of rotor 14 of the transmitter, the register 12 is driven forward by a corresponding amount. The torque energy furnished by rotor 14 and transmitted electrically over lines 16 to the receiver causes a sort of electrical escapement action in the receiver. It causes register 12 to be driven forward when rotor 14 is rotated forward and to stop when rotor 14 stops. The rotors of transmitter and receiver are held in synchronism. However, the greater amount of torque energy for driving register 12 forward is furnished by polyphase induction motor action in the receiver, and meter 10 is thus relieved of this burden and is required to furnish only the small additional controlling torque necessary to hold the receiver rotor in synchronism with the transmitter rotor.

This invention is generally not applicable to those systems where both directions of rotation are automatically required. The polyphase induction motor action of the receiver is in one direction only. The stator winding part 20 may, of course, be reversed to reverse the direction of induction motor action and this may be necessary when installing the apparatus to assure that the two torques furnished to the receiver are in the same direction. This may also be accomplished by reversing two of the wires 16 between transmitter and receiver. The devices will preferably be designed so as best to take advantage of the invention. The secondary induction motor winding need not necessarily be common with the polyphase winding 15 or 24, but the common use of this winding for both telemetering and induction motor purposes is feasible.

In Fig. 2 I have shown a modified form of the invention. The meter 10 and register 12 may be similar to those of Fig. 1. The primary elements 22 and 23 of transmitter and receiver are placed on their rotors, while the secondary elements 24 and 25 which are connected in star instead of in delta are stationary. This in itself represents no departure from the prior art. In applying my invention in Fig. 2, I have made the transmitter a polyphase induction motor. Thus, the rotor winding 22 corresponds to the polyphase winding 18—20 of Fig. 1 and the resistance 21 is connected across its secondary 24. The transmitter thus has induction motor torque and this torque may be made even more than sufficient to drive the rotary parts of the transmitter combination but may be restrained from so doing except as the meter 10 permits it, by reason of a mechanical escapement operated by the meter 10. This escapement may take the form of a worm 26 on meter shaft 13 meshing with a worm gear 27 on the shaft of rotor 22. The transmitter 22 will, of course, be connected to run as an induction motor in the same direction as it would be driven by meter 10. The meter 10 may thus be relieved of all load but will nevertheless accurately control the operation of the transmitter.

The transmitter elements 22 and 24, in addition to their motor action, also function as an electric transmitter whenever rotor 22 advances. Ample rotational torque energy is electrically transmitted to the receiver and causes its operation in synchronism with the transmitter. The telemetering currents which flow to the receiver secondary may be somewhat distorted by reason of the double function of the transmitter but this is not important since exact angular position similarity is not required between transmitter and receiver in applications where the invention will be used. By proper design and adjustment the invention will reproduce the forward rotational movement of the transmitter at the receiver. The invention is also important where several receivers are connected to be operated from one transmitter as, by means of this invention, the torque energy taken from the meter of the transmitter may be reduced to a value only sufficient for control purposes and is not required to supply the torque energy for actual operation of the several receivers. Hence, in both Figs. 1 and 2 I have represented a plurality of similar receivers connected to one transmitter.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is,

1. A telemetering system having transmitters and receivers each provided with relatively rotatable primary and secondary windings, the secondary windings of each device being like a three-phase winding, a three-wire telemetering circuit connecting the secondary windings in parallel, means for supplying single phase energy to the primary windings of said devices, one of which is a single phase winding and the other of which is a split phase winding and produces a rotating, as distinguished from single phase, magnetic field, a three-phase resistance connected across the secondary winding of the device supplied with the rotating magnetic field to produce induction motor torque in such device, rotary means for determining the direction and extent of rotation of the transmitter and rotary means driven by the receiver in synchronism with the transmitter, the induction motor torque furnished by said one device being in the same direction as the telemetering torque of the system and of such a value as to supply a substantial part of the rotational torque energy of the system.

2. A synchronous telemetering system having transmitter and receiver devices, said devices having relatively rotatable primary and secondary windings, the secondary windings being like three-phase windings, a three-wire telemetering circuit connecting the secondary windings in parallel in three-phase relation, means for supplying single phase energy to the primary windings whereby when there is relative rotation between the primary and secondary windings of the transmitter a synchronous telemetering torque is developed in the receiver tending to produce similar relative rotation between its primary and secondary windings, one of said devices being designed and connected to produce an additional induction motor torque in the same direction as the telemetering torque therein, said induction motor torque furnishing a substantial part of the rotational torque energy for the system while permitting synchronous telemetering control action between transmitter and receiver.

3. A synchronous telemetering system comprising transmitting and receiving devices each having relatively rotatable primary and secondary windings, the secondary windings resembling polyphase windings, a multiple wire telemetering system connecting the secondary windings in parallel in polyphase relation, the transmitter having a single phase primary winding and the receiver having a split phase primary winding, a common source of single phase supply for both primary windings, connections for permitting induction motor secondary current to flow in the polyphase connected secondary winding of the receiver, a load device driven by said receiver, means for rotating said transmitter in a given direction, the induction motor torque of said receiver being in the same direction as the telemetering torque therein due to rotation of the transmitter and of such a value as to furnish a large part but not all of the torque for driving its load device, whereby the transmitter is relieved of a substantial part of the torque energy necessary for successful synchronous telemetering action of the system.

4. A synchronous telemetering system comprising transmitter and receiver devices each having relatively rotatable primary and secondary windings, the secondary windings resembling polyphase windings, a multiple wire telemetering circuit connecting the secondary windings in polyphase relation, a common single phase source of supply for energizing the primary windings, the primary winding of the transmitter being a split phase winding and the primary winding of the receiver being a single phase winding, connections for permitting induction motor secondary currents to flow in the secondary winding of the transmitter whereby said transmitter produces an induction motor torque, a rotary device connected to said transmitter through an escapement form of drive such that the transmitter can rotate only as it is allowed to do so by synchronous rotation of the connected rotary device, the induction motor torque of said transmitter being sufficient to rotate its relatively rotatable windings and in addition transmit rotational torque energy for operation of the receiver in synchronism therewith, and the direction of such induction motor torque corresponding to the direction of rotation of the connected rotary device for operation of said escapement.

ABRAM J. MOORE.